United States Patent
McCombs

(10) Patent No.: US 8,234,857 B2
(45) Date of Patent: Aug. 7, 2012

(54) AIR SUPPLY SYSTEM FOR A REGENERATION ASSEMBLY

(75) Inventor: Aaron McCombs, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 891 days.

(21) Appl. No.: 12/213,689

(22) Filed: Jun. 23, 2008

(65) Prior Publication Data

US 2009/0313975 A1    Dec. 24, 2009

(51) Int. Cl.
*F01N 3/025* (2006.01)
(52) U.S. Cl. .......................................... 60/295
(58) Field of Classification Search .............. 60/289, 60/293, 303, 295; 55/282.3, DIG. 10, 30; 431/42, 60, 61, 72, 74
See application file for complete search history.

(56) References Cited

U.S. PATENT DOCUMENTS

| | | | |
|---|---|---|---|
| 4,589,254 A | 5/1986 | Kume et al. | |
| 4,747,771 A * | 5/1988 | Goodfellow et al. | 431/1 |
| 5,085,049 A | 2/1992 | Rim et al. | |
| 5,372,497 A * | 12/1994 | Coolidge et al. | 431/6 |
| 5,930,994 A | 8/1999 | Shimato et al. | |
| 6,090,187 A | 7/2000 | Kumagai | |
| 6,742,331 B2 | 6/2004 | Minami | |
| 6,807,807 B2 | 10/2004 | Kagenishi | |
| 6,820,414 B2 | 11/2004 | Stroia et al. | |
| 6,877,312 B2 | 4/2005 | Nakatani et al. | |
| 7,062,906 B2 | 6/2006 | Otake et al. | |
| 7,086,220 B2 | 8/2006 | Imai et al. | |
| 7,118,613 B2 | 10/2006 | Crawley et al. | |
| 7,237,379 B2 | 7/2007 | Nakano et al. | |
| 7,331,172 B2 | 2/2008 | Persson | |
| 7,343,735 B2 | 3/2008 | Wang et al. | |
| 2004/0098981 A1 | 5/2004 | Crawley et al. | |
| 2005/0193724 A1 | 9/2005 | Webb et al. | |
| 2007/0000241 A1 * | 1/2007 | Funke et al. | 60/295 |
| 2007/0000242 A1 | 1/2007 | Harmon et al. | |
| 2008/0271447 A1 * | 11/2008 | Abel et al. | 60/598 |
| 2009/0288398 A1 * | 11/2009 | Perfetto et al. | 60/287 |

* cited by examiner

*Primary Examiner* — Thomas Denion
*Assistant Examiner* — Jonathan Matthias
(74) *Attorney, Agent, or Firm* — Finnegan, Henderson, Farabow, Garrett & Dunner LLP

(57) ABSTRACT

A method of initiating regeneration of a filter assembly is disclosed. The method includes determining when regeneration of a filter assembly is to be initiated. The method also includes opening a first air valve configured to permit air flow to a regeneration assembly below a predetermined flow rate and at a sufficient flow rate to achieve ignition. The method further includes detecting ignition, and after ignition, opening a second air valve configured to supply air flow to the regeneration assembly above the predetermined flow rate and at a sufficient flow rate for regeneration.

21 Claims, 2 Drawing Sheets

AIR SUPPLY SYSTEM FOR A REGENERATION ASSEMBLY

TECHNICAL FIELD

The present disclosure is directed to an air supply system and, more particularly, to an air supply system for a regeneration assembly.

BACKGROUND

Engines, including diesel engines, gasoline engines, and natural gas engines, for example, may exhaust a complex mixture of emissions to the environment. The emissions may include both gaseous compounds and solid material. The solid material in exhaust emissions may include, for example, particulate matter. Particulate matter may include ash and unburned carbon particles generally referred to as soot.

Environmental concerns have resulted in the development of systems to treat engine exhaust in a variety of ways. Some of these systems may employ exhaust aftertreatment devices, such as particulate filters, to remove particulate matter from the flow of engine exhaust. A particulate filter may include a filter substrate material designed to capture the particulate matter. After a period of engine operation and use of the particulate filter, the filter substrate material may become partially saturated with the particulate matter being filtered out of the exhaust. This partial saturation may hinder the ability of the particulate filter to remove additional particulate matter from the exhaust flow, and also may adversely affect engine operation.

The collected particulate matter may be removed from the filter material through a process called regeneration in order to enable the filter material to continue its intended function of capturing particulate matter. A particulate filter may be regenerated by increasing the temperature of the filter material above the combustion temperature of the captured particulate matter. The increase in temperature to support oxidation of particulate matter may be effectuated by a regeneration assembly of the type that includes a combustion chamber. The combustion chamber may require an air supply system to support combustion. During regeneration, air may flow, via the air supply system, and mix with fuel to support combustion within the regeneration assembly and create enough heat to oxidize the particulate matter and regenerate the particulate filter.

It is sometimes the case that combustion air for a regeneration assembly is drawn from a boosted intake air supply for the engine. Regeneration may occur at preprogrammed times, or at times when a threshold accumulation of particulate matter in the particulate filter is detected. Such times may occur during machine operation when the engine is operating at various speeds and/or under various loads. Accordingly, the air supply, for example the air supply drawn from a boosted intake air supply for the engine, may vary. Accommodating a varying air supply while assuring reliable regeneration is sometimes accomplished with a somewhat sophisticated, i.e., "smart," hydraulically actuated air valve capable of maintaining a constant air flow while depending on the varying air supply. It would be beneficial and desirable to be able to supply air to a regeneration assembly and achieve reliable regeneration with less sophisticated, and therefore less costly, air valves.

One system for supplying combustion air to a regeneration assembly is disclosed in U.S. Pat. No. 4,589,254, issued to Kume et al. on May 20, 1986 ("the '254 patent"). The '254 patent discloses a filter for exhaust gases, and a burner that may regenerate the filter. In the '254 patent, primary air is directed via one flow path to the burner at high pressure to atomize injected fuel, and secondary air is directed via another flow path to the burner at low pressure to support combustion during regeneration. A pressure regulating valve adjusts the flow rate of the primary air, and a flow control valve adjusts the cross-sectional area of the flow path for the secondary air. The system of the '254 patent includes a relatively complex arrangement including an array of diaphragm valves intended to control secondary air flow with high precision, regardless of variations in operation of an air pump, or fluctuations in atmospheric temperature or pressure in the secondary air line.

While the system of the '254 patent contemplates controlling air flow to a regeneration assembly, the system may be unduly complicated. For example, in the system of the '254 patent, various embodiments are disclosed requiring an arrangement including a pump, multiple diaphragm valves, and various connecting passageways for controlling the secondary combustion air. In addition, a separate pump, pressure regulating valve, and passageway are required to control the flow of primary air for atomizing fuel for combustion. Further, the system of the '254 patent fails to make provision for a low flow of air until ignition, and this failure may result in a further failure to generate a sustainable flame in the burner. Moreover, the system of the '254 patent may be overly complex, difficult to maintain in proper working order, and too expensive.

The disclosed air supply system for a regeneration assembly is directed toward improvements in the existing technology.

SUMMARY

In one aspect, the present disclosure includes a method of initiating regeneration of a filter assembly. The method includes determining when regeneration of a filter assembly is to be initiated. The method also includes opening a first air valve configured to permit air flow to a regeneration assembly below a predetermined flow rate and at a sufficient flow rate to achieve ignition. The method also includes detecting ignition, and, after ignition, opening a second air valve configured to supply air flow to the regeneration assembly above the predetermined flow rate and at a sufficient flow rate for regeneration.

In another aspect, the present disclosure includes an air supply system. The system includes a first air valve configured to supply air to a regeneration assembly below a predetermined flow rate and a second air valve configured to supply air to a regeneration assembly above the predetermined flow rate. The system also includes a controller configured to determine when regeneration of a filter assembly is to be initiated, open the first air valve to permit ignition within the regeneration assembly, determine when ignition has been achieved, and open the second air valve when it is determined that ignition has been achieved.

DETAILED DESCRIPTION

Figure 1:
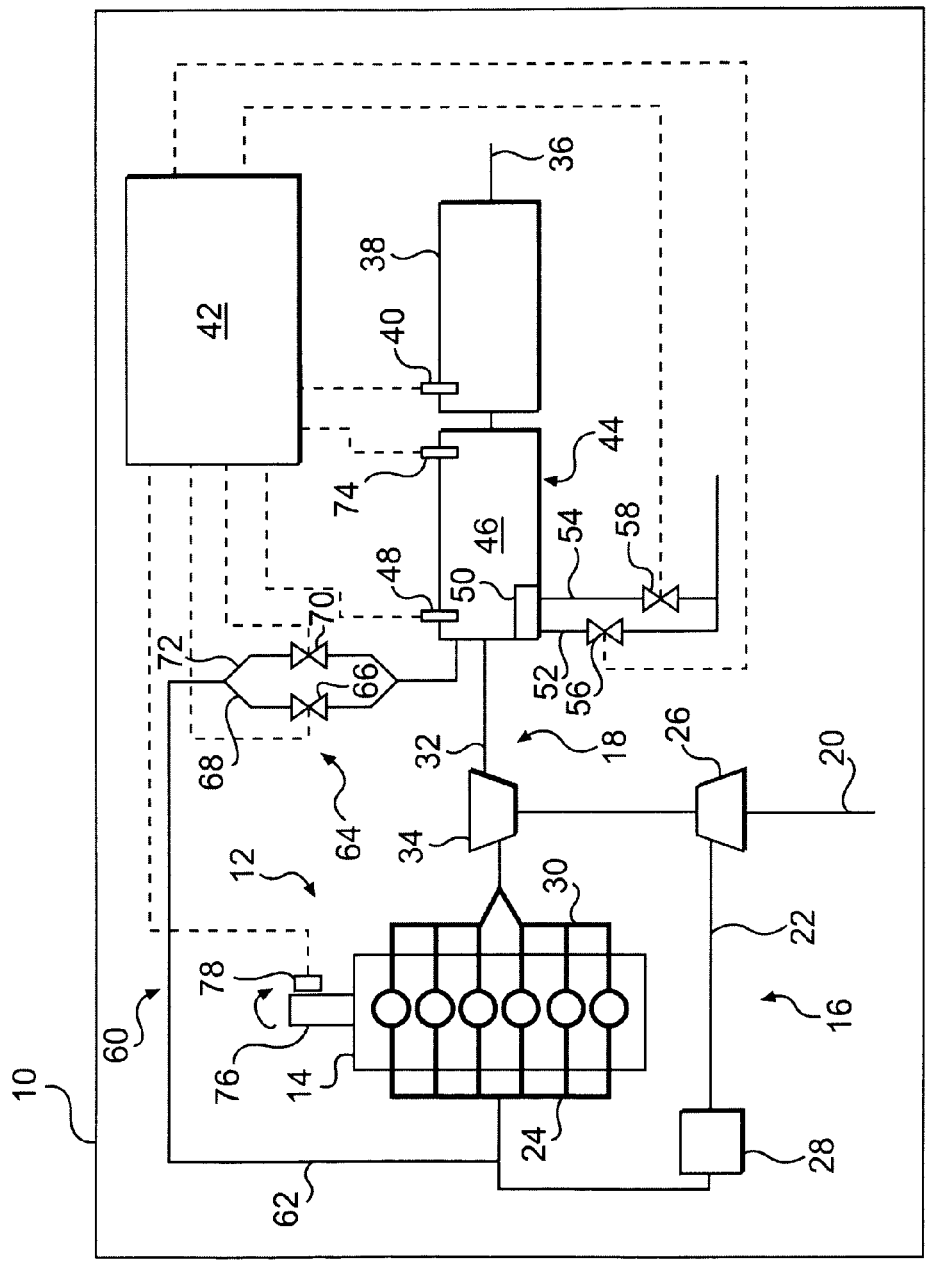
FIG. 1 is a diagrammatic and schematic illustration of a system according to an exemplary embodiment of the present disclosure.

A machine 10, in which exemplary disclosed embodiments may be implemented, is diagrammatically represented in FIG. 1. Machine 10 may be any of various mobile or stationary machines, including an on-highway truck, an off-highway haulage unit, an excavating machine, a material handling machine, a stationary power generating machine, or any of various heavy equipment machines, for example.

An engine system 12 may be associated with machine 10. Engine system 12 may include an engine 14 and various subsystems generally associated with an engine. Engine 14 may be any one of various types of engines, such as a gasoline fueled engine, a diesel fueled engine, or a gas fueled engine. Engine 14 may include, among other things, an air intake system 16 and an exhaust system 18, both diagrammatically illustrated in FIG. 1.

Air intake system 16 may include various components that are generally associated with engine air intake systems. For example, air intake system 16 may include an opening 20 for intake air drawn, for example, from the atmosphere. An intake air flow passage 22 may direct air from opening 20 to an air intake manifold 24, where the air may be channeled to one or more combustion chambers (not shown) in engine 14. Air intake system 16 also may include a compressor 26 that may boost, i.e., compress, intake air above atmospheric pressure, and a cooling unit 28 that may cool the boosted intake air that may have been heated during compression in compressor 26. Compressor 26 may be, for example, an engine driven compressor or a component of an exhaust driven turbocharger. Cooling unit 28 may be, for example, an air-to-air aftercooler or an air-to-liquid aftercooler.

Exhaust system 18 also may include various components generally associated with an engine exhaust system. For example, exhaust system 18 may include an exhaust manifold 30 that may channel engine exhaust from one or more combustion chambers in engine 14 into an exhaust flow passage 32. Exhaust system 18 also may include one or more energy extracting devices, such as turbine 34, which may in turn drive one or more air pressurizing devices, such as compressor 26, suitably situated in the air intake system 16 for compressing the intake air. Additionally, various components particularly designed to control exhaust emissions, examples of which will be described below, may be associated with the exhaust system 18. Exhaust system 18 may extend from a location at which it is connected to engine 14, for example at exhaust manifold 30, to a position where exhaust is ultimately emitted to the environment, for example at exhaust opening 36.

One component that may be provided in exhaust system 18, and that is designed to control exhaust emissions, may be referred to generally as an aftertreatment device. An example of an aftertreatment device is filter assembly 38. Filter assembly 38 may include, for example, a particulate filter which may remove soot and other particulates from exhaust gases. In the case of a diesel engine, the particulate filter may generally be referred to as a diesel particulate filter (DPF). As filter assembly 38 accumulates removed soot and other particulates, filter assembly 38 may tend to become less efficient in its intended purpose. An accumulation of soot and other particulates in filter assembly 38 also may tend to restrict the flow of exhaust gases and may affect engine operation.

One or more suitable diagnostic devices or sensors, such as diagrammatically illustrated sensor 40, for example, may monitor one or more parameters associated with the accumulation of soot and particulates in filter assembly 38. Exemplary parameters that may be indicative of an accumulation of particulate matter in filter assembly 38 include temperature increase, pressure increase, and differential pressure across a particulate filter within filter assembly 38. Sensor 40 may communicate with a suitable controller 42 designed and configured to monitor incoming signals and issue appropriate outgoing signals. Sensor 40 may send a signal to controller 42 indicative of a condition in filter assembly 38 that may be alleviated by maintenance, such as filter regeneration.

A regeneration assembly 44 may be suitably associated with filter assembly 38. For example, regeneration assembly 44 may be located upstream relative to the direction of exhaust flow from filter assembly 38, and generally proximate to filter assembly 38, in or proximate to the flow path of exhaust gases in exhaust system 18. Regeneration assembly 44 may include a suitable combustion chamber 46 into which fuel and air may be introduced and ignited by a suitable ignition device, such as igniter 48. Heat generated by combustion within the regeneration assembly 44 may raise exhaust gases to a temperature sufficient to consume soot accumulated in proximately situated filter assembly 38.

Referring to FIG. 1, the general flow of exhaust through exhaust system 18, and the arrangement of elements associated with regeneration assembly 44, are diagrammatically illustrated. Fuel for combustion within regeneration assembly 44 may be introduced via at least one diagrammatically illustrated fuel injector unit 50. It will be understood that fuel injector unit 50 may be any suitable injector or nozzle designed for and capable of injecting fuel into the combustion chamber 46 of regeneration assembly 44. It also will be understood that there may be plural injector units, and that fuel injector unit 50 may include plural injectors or nozzles. Fuel injector unit 50 may be configured to supply both pilot and main injections of fuel, for example via separate fuel lines 52, 54, and separate fuel valves 56, 58, which may be controlled by controller 42.

A source of combustion air may be delivered to regeneration assembly 44 via an air supply system 60. Air supply system 60 may include a combustion air flow passage 62. Delivery of combustion air via air flow passage 62 may be suitably controlled with a flow control unit 64. In an exemplary embodiment, flow control unit 64 may include one or more valves. FIG. 1 illustrates an embodiment in which flow control unit 64 includes two valves arranged in parallel. Flow control unit 64 may includes a first air valve 66, situated in a first branch passage 68, and a second air valve 70, situated in a second branch passage 72.

First air valve 66 may be a low-flow air valve, and second air valve 70 may be a high-flow air valve. For example, first air valve 66 may be an electrically actuated on/off valve designed and configured to deliver a controlled flow of air within the range of approximately 35 kg/hr, and designed and configured to control the pressure of the flow of air at approximately 5 psi. Second air valve 70 also may be an electrically actuated on/off valve. Second air valve 70 may be designed and configured to deliver a controlled flow of air within the range of approximately 150 kg/hr, and designed and configured to control the pressure of the flow of air at approximately 50 psi.

In the exemplary embodiment illustrated in FIG. 1, first air valve 66 is indicated to be the low-flow valve, and second air valve 70 is indicated to be the high-flow valve. However, it will be understood that either of first and second air valves 66, 70 may be the low-flow air valve, and either may be the high-flow valve. It also will be understood that the identified flow rates and pressure designations are exemplary, but that one of air flow valves 66, 70 is relatively higher or lower than the other. Each of first and second air valves 66, 70 may communicate with and be controlled by controller 42.

Combustion air may be derived directly from ambient, may be derived from air intake system 16 of engine 14, may be derived from a suitable compressor, and/or may include a mixture of air and exhaust gases derived from exhaust system 18. In the exemplary embodiment illustrated in FIG. 1, combustion air for regeneration assembly 44 may be derived via an air flow passage 62 shown connected to air intake flow passage 22 at a location downstream from compressor 26 so that the source of combustion air directed to regeneration assembly 44 may be boosted air at a pressure somewhat above atmospheric pressure.

One or more suitable diagnostic devices or sensors, such as sensor 74, may be associated with regeneration assembly 44 to monitor one or more parameters associated with the operation of regeneration assembly 44. For example, sensor 74 may be configured to detect ignition within regeneration assembly 44. Sensor 74 may detect ignition by receiving visible or infrared rays, for example, and may in turn send an appropriate signal to controller 42 indicating that ignition has been achieved.

Suitable expedients may be provided to monitor and control engine speed in order to enable activation of regeneration assembly 44 for regeneration of filter assembly 38 at appropriate times. For example, engine 14 may include a drive output, such as engine output shaft 76, having a speed of rotation that is indicative of engine speed. A suitable sensor 78 may detect rotation of engine output shaft 76, and enable a determination of engine speed. Sensor 78 may deliver appropriate signals to controller 42 based on the detected rotation of engine output shaft 76. Controller 42 may process signals from sensor 78 and determine engine speed, for example idle speed or some speed greater than idle speed. It will be understood that engine speed may be determined by suitable expedients other than detection of the rotational speed of the engine output shaft 76.

In the exemplary embodiment illustrated in FIG. 1, controller 42 may be connected by suitable lines, illustrated by dotted lines in FIG. 1, to the various diagnostic devices, valves, and other components to be monitored and/or controlled. Controller 42 may include a computer supplied with suitable algorithms, programs, and/or control strategies designed to effectuate efficient operation of machine and system components. For example, controller 42 may be a suitable engine control module (ECM), typically associated with modern engines. It will be understood that all communications between controller 42 and machine and system components also may be achieved with a suitable wireless communication system.

INDUSTRIAL APPLICABILITY

Figure 2:
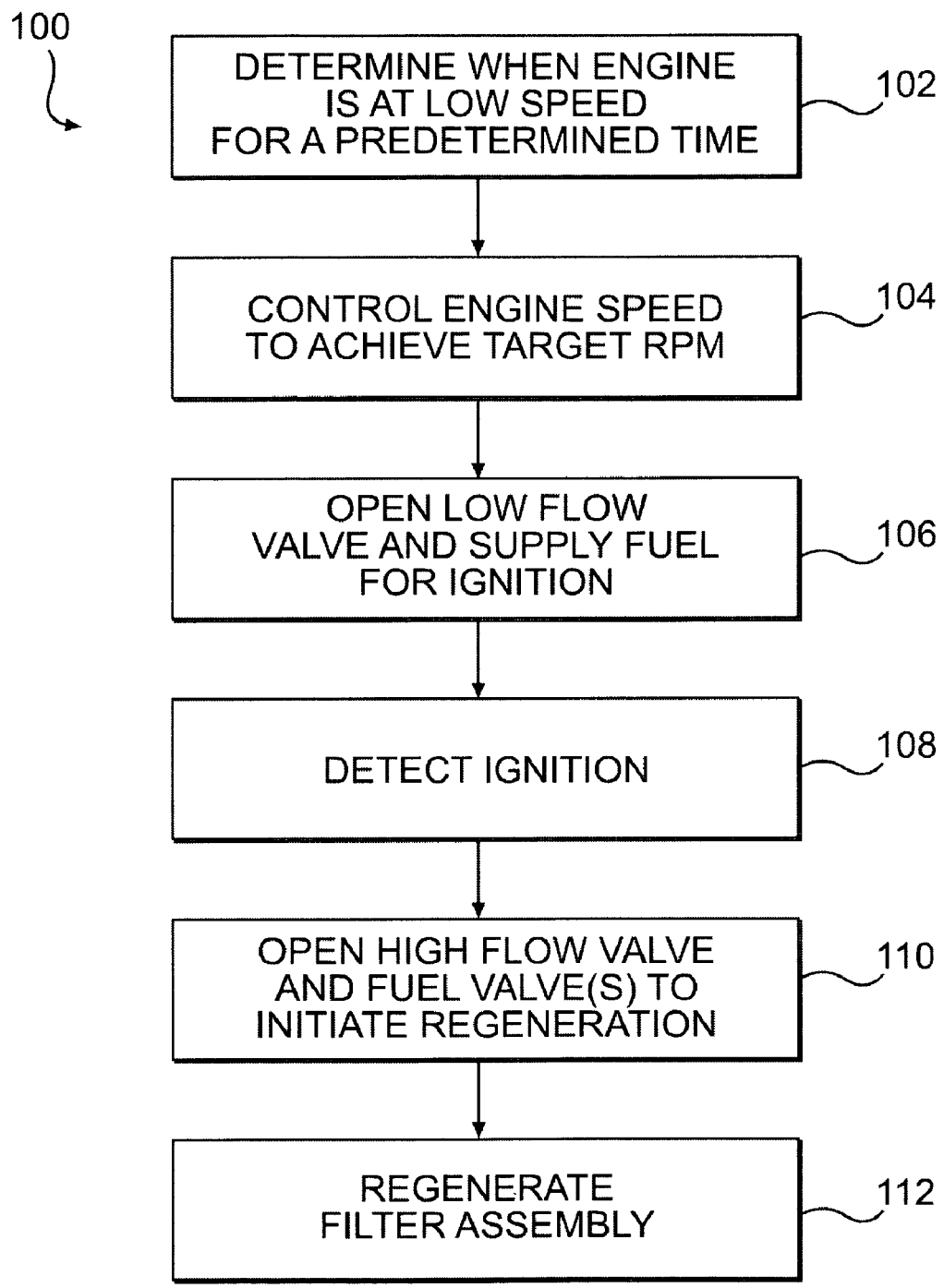
FIG. 2 is a flow diagram illustrating a process according to an exemplary embodiment of the present disclosure.

FIG. 2 illustrates a flow chart 100 that may assist in understanding an exemplary process and strategy for supplying combustion air to a regeneration assembly, and for regeneration of a filter assembly. It will be understood that the steps illustrated in FIG. 2 and described in more detail herein are exemplary. It is contemplated that the disclosed process may include steps other than those illustrated. In addition, certain steps may not be performed in some situations. Also, the order of the process steps in FIG. 2 is exemplary, and may be altered in certain embodiments. The several steps indicated to be included in the process and control strategy illustrated in the flow chart of FIG. 2 may be carried out in association with and under the control of a suitable algorithm that may be installed in the controller 42.

Regeneration of a filter assembly, such as filter assembly 38, advantageously may be accomplished during operation of a machine when the engine associated with the machine is operating under relatively low load and at relatively low speed. As a non-limiting example, overall efficiency of machine operation and filter assembly regeneration may be improved where regeneration occurs while the engine is operating at a speed of approximately 1000 rpm or lower, and/or, as a non-limiting example, while the engine is operating with limited engine load, such as under a load that is approximately 20% or lower of maximum engine load. In addition, regeneration may occur while the engine is operating under steady state conditions rather than transient operating conditions with changing engine speeds and loads.

Referring to flow chart 100 in FIG. 2, a process that includes controlling the supply of air to a regeneration assembly and initiating regeneration of a filter assembly may begin at step 102. The process may begin with determining when regeneration of the filter assembly is to be initiated. For example, this may include determining when engine 14 is operating below a threshold speed for a predetermined period of time. Controller 42 may, via signals received from sensor 78, determine that engine 14 has been operating at low or idle speed, e.g., approximately 650 rpm, for a period of one minute. An engine operating speed commensurate with an idle speed for a predetermined period of time may be indicative that the machine associated with the engine is undergoing a period of rest or low load operation. Both the determined engine speed and the time at which the engine is operating at the determined engine speed may vary.

While in an exemplary embodiment the determination of when regeneration of the filter assembly is to be initiated may include determining when engine 14 is operating below a threshold speed for a predetermined period of time, it is contemplated that other triggers for initiation of regeneration may be employed. For example, engagement of a parking brake (not shown) may override any determination of engine operation below a threshold speed and may be employed as a trigger for the initiation of regeneration. In addition, it is contemplated that a switch (not shown) also may be employed to override any determination of engine operation below a threshold speed and may be employed to manually initiate the regeneration process.

Once controller 42 has determined that engine 14 has been operating at low speed for a predetermined time, controller 42 may generate signals to adjust engine speed to achieve a target engine speed suitable for initiating regeneration of filter assembly 38, at step 104. The target engine speed may be an engine speed in excess of idle speed. For example, target engine speed may be approximately 1000 rpm or lower. However, depending on factors such as type and size of the engine, the target speed may be at or near idle speed, or in excess of approximately 1000 rpm.

Upon achieving a target engine speed, the process may proceed with the opening of first air valve 66, configured to permit air flow to the combustion chamber 46 of regeneration assembly 44 only below a predetermined, low flow rate, and of sufficient flow rate to initiate ignition, at step 106. Controller 42 may issue a signal to igniter 48. First air valve 66 may provide enough combustion air to enable proper ignition, while not supplying so much air as to extinguish the flame being established during ignition. Typically, first air valve 66 is an inexpensive on/off valve that may be electrically controlled to permit a low flow of air within the range of approximately 35 kg/hr, at a pressure of approximately 5 psi.

Once igniter 48 has received an ignition signal from controller 42 and first air valve 66 has been activated, one or more fuel valves 56, 58 may be activated to introduce sufficient fuel to achieve ignition. After a suitable interval for ignition to occur, an ignition detector, such as sensor 74, may detect ignition at step 108. Sensor 74 may be a suitable sensor that is configured to detect ignition based, for example, on reception of visible or infrared light rays emitted upon ignition within combustion chamber 46 of regeneration assembly 44. Upon appropriate detection of ignition, sensor 74 may send a signal to controller 42 indicative that ignition has been achieved.

After controller 42 has received a signal indicating that ignition has been achieved, controller 42, at step 110, may issue a signal directing the opening of second air valve 70 configured to supply air flow to the regeneration assembly 44 above a predetermined flow rate and of sufficient flow rate to initiate regeneration. The predetermined flow rate serving as a lower limit for the flow rate for second air valve 70 at step 110 may be the same predetermined flow rate that serves as the upper limit for the flow rate for first air valve 66 at step 106, or it may be a different predetermined flow rate.

Controller 42 also may issue a signal or signals, at step 110, to one or more of fuel valves 56, 58, to increase the introduction of fuel to support combustion within combustion chamber 46 of regeneration assembly 44 and initiate regeneration of filter assembly 38. Second air valve 70 may provide sufficient combustion air to enable proper combustion within combustion chamber 46 and enable an effective regeneration of filter assembly 38. Typically, second air valve 70 is an inexpensive on/off valve that may be electrically controlled to permit a high flow of air within the range of approximately 150 kg/hr, at approximately 50 psi.

In some circumstances, depending on factors such as engine type, engine size, and depending on engine speed and load at the time of regeneration, both of first air valve 66 and second air valve 70 may be opened simultaneously in order to insure a sufficient flow of air for combustion. In other circumstances, first air valve 66 may be closed when second air valve 70 is open.

Once combustion is on-going and regeneration of filter assembly 38 has begun, controller 42 may continue the regeneration process for filter assembly 38 until regeneration is achieved, at step 112. Engine 14 may be operated at a load that is less than a threshold load, e.g., less than 20% of maximum engine operating load, during regeneration of the particulate filter. Once regeneration has been completed, accumulated soot within filter assembly 38 may have been consumed during the regeneration process, and filter assembly 38 may be in a condition to more efficiently and effectively remove additional particulate matter from engine exhaust. Controller 42 may issue appropriate signals to close second air valve 70, close first air valve 66 if it is open, and close fuel valves 56 and 58. Machine and engine operation may then continue until the process is renewed, after a period of operation, beginning at step 102.

A system and method have been described that will facilitate and increase the efficiency and effectiveness of a regeneration process. This desirable end is accomplished in a controlled and effective manner with the provision of relatively inexpensive air valves for controlling the flow of combustion air to a regeneration assembly. Instead of employing relatively sophisticated hydraulically operated air control valves, relatively simple on/off valves may be employed with success when a strategy for regeneration is followed such that regeneration occurs after detecting that the engine is operating at low speed for a predetermined time, and a target engine speed is achieved before ignition within the regeneration assembly.

Controlling regeneration to occur during low engine speed and while limiting engine load may ensure that boost pressure is relatively low during regeneration. This may in turn ensure that combustion air for the regeneration assembly, where directed from a common source that includes the boosted engine intake air supply, is at a pressure and a flow rate low enough to permit the use of relatively unsophisticated low and high flow air valves rather than more sophisticated hydraulically operated air valves that may be necessary to withstand high boost pressures.

Controller 42 may be programmed to bypass the process illustrated and described in connection with FIG. 2 where engine 14 is operating at a low speed for a predetermined time, but filter assembly 38 has not accumulated a sufficient deposit of soot to warrant a regeneration process. For example, where a suitable diagnostic device, such as sensor 40, sends signals to controller 42 indicating that filter assembly 38 has not accumulated enough soot for regeneration to be efficiently performed, controller 42 may bypass the process until sufficient soot to justify efficient regeneration has accumulated. Accordingly, regeneration may be initiated only after a predetermined accumulation of particulate matter is detected.

The disclosed embodiments may be used to facilitate effective and cost efficient regeneration of a filter by a regeneration assembly, such as regeneration assembly 44. Filters that may be regenerated may include any type of filters known in the art that are capable of being regenerated, such as particulate filters useful in extracting pollutants from a flow of engine exhaust. The disclosed embodiments may enable the use of inexpensive air valves for the regeneration assembly 44, and may enable activation of regeneration assembly 44 at those times during engine operation more conducive to both efficient machine operation and efficient and effective filter regeneration.

It will be apparent to those having ordinary skill in the art that various modifications and variations can be made to the disclosed method and system for controlling the air supply for a regeneration assembly without departing from the scope of the disclosure. While exemplary embodiments have been disclosed in connection with the disclosed system and method, other embodiments will be apparent to those having ordinary skill in the art from consideration of the specification and practice of the disclosed embodiments. It is intended that the specification and examples be considered as exemplary only with the true scope of protection being indicated by the following claims.

What is claimed is:

1. An air supply system, comprising:
   a first air valve situated in a first branch passage and configured to supply air to a regeneration assembly below a predetermined flow rate;
   a second air valve situated in a second branch passage and configured to supply air to the regeneration assembly above the predetermined flow rate; and
   a common passage fluidly connected to the first and second branch passages downstream of the first and second air valves, the common passage being configured to supply air from the first and second air valves to the regeneration assembly; and
   a controller configured to:
      determine when regeneration of a filter assembly is to be initiated;
      open the first air valve to permit ignition within the regeneration assembly;
      determine when ignition has been achieved; and
      open the second air valve when it is determined that ignition has been achieved.

2. The system of claim 1, wherein the first air valve and the second air valve are on/off valves.

3. The system of claim 1, including a source of air, and wherein the first air valve and the second air valve are arranged in parallel downstream from the source of air.

4. The system of claim 1, wherein the controller is configured to control the first air valve to remain open only until ignition has been achieved.

5. The system of claim 1, wherein the controller is configured to maintain both the first and second air valves open during regeneration of the filter assembly.

6. The system of claim 1, wherein the air is supplied via the first and second air valves to the regeneration assembly separately from a fuel flow supplied to the regeneration assembly.

7. A machine, comprising:
   an engine system including an engine and an exhaust flow passage;
   a filter assembly in the exhaust flow passage;
   a regeneration assembly configured to regenerate the filter assembly and including a combustion chamber;
   a source of combustion air for the combustion chamber of the regeneration assembly;
   a first branch passage fluidly connected to the source of combustion air;
   a first air valve disposed in the first branch passage and configured to permit a flow of air to the combustion chamber below a predetermined flow rate, the combustion chamber receiving the flow of air from the first air valve separately from fuel;
   a second branch passage fluidly connected to the source of combustion air parallel to the first branch passage;
   a second air valve disposed in the second branch passage and configured to permit a flow of air to the combustion chamber above the predetermined flow rate, the combustion chamber receiving the flow of air from the second air valve separately from fuel;
   a common passage fluidly connected to the first and second branch passages, the common passage being disposed downstream of the first and second air valves and upstream of the combustion chamber; and
   a controller configured to:
     determine when to initiate regeneration of the filter assembly;
     open the first air valve to permit ignition within the combustion chamber;
     determine when ignition has been achieved; and
     open the second air valve when ignition has been achieved.

8. The machine of claim 7, wherein the engine system further includes:
   an intake air flow passage configured to deliver air to the engine; and
   a compressor associated with the air intake flow path and configured to increase the pressure of the air delivered to the engine, wherein the source of combustion air for the combustion chamber of the regeneration assembly includes a passage connected to the air intake flow path at a location downstream of the compressor.

9. The machine of claim 8, further including a turbine located in the exhaust flow passage and configured to drive the compressor.

10. The machine of claim 7, wherein the controller is configured to adjust engine speed to a target speed for regeneration of the filter assembly.

11. The machine of claim 7, wherein the controller is configured to initiate regeneration of the filter assembly only after the engine has remained at idle speed for a predetermined period of time.

12. The machine of claim 7, wherein the engine is a diesel engine and the filter assembly includes a diesel particulate filter.

13. A method of initiating regeneration of a filter assembly, comprising:
   determining when regeneration of the filter assembly is to be initiated;
   opening a first air valve configured to permit air flow to a regeneration assembly below a predetermined flow rate and at a sufficient flow rate to achieve ignition, the first air valve being situated in a first branch passage;
   detecting ignition; and
   after ignition, opening a second air valve configured to supply air flow to the regeneration assembly above the predetermined flow rate and at a sufficient flow rate for regeneration, the second air valve being situated in a second branch passage, the first and second branch passages being configured to direct air flow to a common passage, the common passage being located downstream of the first and second air valves and upstream of the regeneration assembly.

14. The method of claim 13, wherein determining when regeneration of a filter assembly is to be initiated includes determining when an engine is operating below a threshold speed for a predetermined period of time before opening the first air valve.

15. The method of claim 14, wherein determining when the engine is operating below the threshold speed includes detecting when the engine is operating at idle speed.

16. The method of claim 14, further including controlling the engine to achieve a target engine speed for regeneration of the filter assembly after determining when the engine is operating below the threshold speed for the predetermined period of time.

17. The method of claim 16, further including limiting engine load to less than a threshold load during regeneration of the filter assembly.

18. The method of claim 13, further including introducing fuel to the regeneration assembly.

19. The method of claim 13, further including directing air to the first and second air valves from a common source.

20. The method of claim 19, wherein directing air to the first and second air valves from the common source includes directing boosted engine intake air.

21. The method of claim 13, wherein the filter assembly is a particulate filter, and further including detecting an accumulation of particulate matter in the particulate filter, and initiating regeneration of the particulate filter only after a predetermined accumulation of particulate matter is detected.

* * * * *